United States Patent [19]

Popa et al.

[11] Patent Number: 5,162,460

[45] Date of Patent: Nov. 10, 1992

[54] MOISTURE-CURABLE SILICONE CORROSION RESISTANT COATINGS

[75] Inventors: Paul J. Popa, Bay County; Harold L. Vincent; Anh Be, both of Midland County, all of Mich.

[73] Assignee: Dow Corning Corporation, Midland, Mich.

[21] Appl. No.: 778,049

[22] Filed: Oct. 17, 1991

[51] Int. Cl.$^5$ .......................................... C08F 283/00
[52] U.S. Cl. ...................................... 525/478; 528/17; 528/18; 528/31; 528/33
[58] Field of Search .................. 528/31, 33, 17, 18; 525/478

[56] References Cited

U.S. PATENT DOCUMENTS

| | | | |
|---|---|---|---|
| 3,069,451 | 12/1962 | Fritz | 260/448.2 |
| 3,101,277 | 8/1963 | Eder et al. | 117/132 |
| 3,127,383 | 3/1964 | Nitzsche et al. | 525/478 |
| 3,145,175 | 8/1964 | Wright | 252/28 |
| 3,397,046 | 8/1968 | Greyson | 29/195 |
| 3,450,736 | 6/1969 | De Monterey | 260/448.2 |
| 4,332,844 | 6/1982 | Hamada et al. | 427/387 |
| 4,477,641 | 10/1984 | Matsumoto et al. | 528/15 |
| 4,701,380 | 10/1987 | Narula et al. | 428/447 |
| 4,849,564 | 7/1989 | Shimizu et al. | 524/114 |
| 5,051,311 | 9/1991 | Popa et al. | 428/447 |
| 5,068,301 | 11/1991 | Okamura et al. | 528/15 |

FOREIGN PATENT DOCUMENTS 0299641  1/1989  European Pat. Off. .
56-145111  11/1981  Japan .

OTHER PUBLICATIONS

Rudoi, V. M., V. A. Ogarev and A. A. Trapesnikov. *Kolloidn Zr.* (*Colloid Journal*), 32(2), pp. 401–403 (1975).

*Primary Examiner*—Melvyn I. Marquis
*Assistant Examiner*—Margaret W. Glass
*Attorney, Agent, or Firm*—Alexander Weitz

[57] ABSTRACT

A method for imparting corrosion resistance to a metal substrate comprising coating said substrate with a moisture-curable silicone composition is disclosed. The composition consists essentially of a tetrafunctional or hexafunctional silicone polymer (I) which is modified with a liquid organohydrogenpolysiloxane (II) such that, when the functional groups of (I) are alkoxy radicals, the organohydrogenpolysiloxane contains at least 4 silicon hydride groups per molecule and when the functional groups of (I) are oxime groups, the organohydrogenpolysiloxane contains at least 5 silicon hydride groups per molecule.

22 Claims, No Drawings

MOISTURE-CURABLE SILICONE CORROSION RESISTANT COATINGS

FIELD OF THE INVENTION

The present invention relates to a method for imparting corrosion resistance to a metal substrate. More particularly, the invention relates to coating said substrate with a moisture-curable composition containing an alkoxy or oxime-functional silicone polymer and an organohydrogenpolysiloxane.

BACKGROUND OF THE INVENTION

Various workers have noted that certain compounds and compositions containing hydrogen groups on silicon atoms (SiH groups) can impart a measure of corrosion resistance to metals under particular circumstances. This observation has been documented in such patents as U.S. Pat. No. 3,397,046 to Greyson, in which an organohydrogenpolysiloxane is heat cured on a silver coated copper conductor and then overcoated with a polymeric insulating layer. Likewise. U.S. Pat. No. 3,069,451 to Fritz mentions that certain SiH-containing silanes prepared according to his method can form laquer-like coatings which can be utilized for anti-rust purposes. De Monterey, in U.S. Pat. No. 3,450,736. reacted SiH-functional polysiloxanes with an ethylenically unsaturated compound to obtain a modified polymer having good lubricating and corrosion inhibition properties. Wright, in U.S. Pat. No. 3,145,175, discloses a grease composition which provides improved corrosion resistance to metals, which composition is a thickened copolymer containing SiH groups or a thickened mixture of a diorganopolysiloxane and an organohydrogenpolysiloxane. Japanese Kokai (Laid Open) 56-145111 to Asahi Chemical Industry Company teaches rust-preventing pigments comprising microparticulated hydrogenated silicon which can be added to paint formulations.

U.S. Pat. No. 4,701,380 to Narula et al. discloses curable compositions which provide corrosion protection to metals. These compositions are based on a hydroxy-terminated diorganopolysiloxane polymer and contain either a reaction product or blend of a resinous copolymeric siloxane and a liquid organohydrogenpolysiloxane in addition to an organosilane which promotes adhesion to substrates. Similar compositions, which are specifically designed to be applied by spraying, are also taught in U.S. Pat. No. 5.051.311 to Popa et al. European Patent Application 0299641 (published on Jan. 18, 1989) to Dow Corning Corporation discloses curable compositions which provide corrosion protection to metals. These compositions are similar to those of the above cited patent to Narula et al. and are also based on a combination of a hydroxy-terminated diorganopolysiloxane polymer and either a reaction product or blend of a resinous copolymeric siloxane and a liquid organohydrogenpolysiloxane but attribute improved corrosion performance to the addition of alumina or hydrates of alumina.

The use of SiH-containing compounds is also known in compositions which promote adhesion between silicone materials and various other substrates. For example, Hamada et al., in U.S. Pat. No. 4,332,844, teach primer compositions for silicone rubbers containing an alkoxy-functional silicon compound, an organotitanate and an organohydrogensilicon compound. In Kolloidn. Zr. (Colloid Journal), 32(2), p. 401–403 (1975), Rudoi et al. studied the kinetics of bond formation between a glass surface and a hydroxy-terminated filled polydimethylsiloxane containing a crosslinker/adhesion promoter which was a product of hydrolytic condensation of tetraethoxysilane with oligomeric polydiethylethylhydrogensiloxane.

Although the above references may invite further experimentation with various SiH-containing compounds or compositions for the purpose of improving adhesion or corrosion resistance in other systems, there is no suggestion provided by this art as to the possible benefit to expect in any particular system. In other words, there is no practical guidance provided in the above literature that would lead the skilled artisan to reliably predict additional compositions which could be advantageously modified to obtain the desired properties.

SUMMARY OF THE INVENTION

Applicants have now discovered that two different types of moisture-curable silicone compositions can be used as corrosion resistant coatings when each is modified with particular organohydrogenpolysiloxanes according to the present invention. It has been found that silicone room temperature vulcanizing (RTV) compositions of the invention which cure through alkoxy or oxime functionality can be modified to provide significantly improved corrosion resistance when cured on a metal substrate by the inclusion of specific amounts of certain organohydrogenpolysiloxanes. Thus, in order to be considered within the scope of the present invention, the corrosion resistance of a metal substrate coated with the cured silicone composition is characterized by at least 1000 hours of failure-free salt fog exposure, the test methods and definitions of "failure" being detailed infra. Furthermore, to be within the scope of the invention, the failure-free time in the above test must be at least twice that obtained for the corresponding control silicone composition which does not contain said organohydrogenpolysiloxane. To the contrary, at least one other moisture-curable silicone system of the type described in U.S. Pat. No. 3,817,909 to Toporcer et al. and based on hydroxy-ended polydimethylsiloxane which was chain extended with an acetamidosilane and capped with aminoxysilicon functionality, could not be so modified and actually resulted in decreased corrosion protection relative to the unmodified control RTV composition.

The present invention therefore relates to a method for imparting corrosion resistance to a metal substrate comprising coating said substrate with a moisture-curable silicone composition and subsequently curing said silicone composition on said substrate, said silicone composition consisting essentially of a homogeneous blend of (I) a silicone polymer selected from the group consisting of those having the average structure

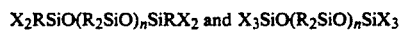

$X_2RSiO(R_2SiO)_nSiRX_2$ and $X_3SiO(R_2SiO)_nSiX_3$ wherein R and R' are monovalent hydrocarbon radicals, at least 95 mole percent of groups R' being methyl. X is a hydrolyzable group selected from the group consisting of an alkoxy radical having 1 to 3 carbon atoms and an oxime group having the formula $-ON=C(R'')_2$, in which R'' is independently selected from the group consisting of an alkyl radical having 1 to 20 carbon atoms and vinyl and n has a value such that said silicone polymer has viscosity of about 1 to 500 Poise at 25° C.; and (II) from about 10 to about 50 parts by weight, per 100 parts by weight of said silicone polymer (I), of a liquid organohydrogenpolysiloxane, the organic groups of which are independently selected from the group consisting of alkyl radicals having 1 to 4 carbon atoms and a phenyl radical, no more than 20 mole percent of said organic groups of said organohydrogenpolysiloxane (II) being phenyl with the proviso that when X of said silicone polymer (I) is said alkoxy radical, said silicone composition further comprises an effective amount of a cure catalyst for said silicone polymer (I) and said organohydrogenpolysiloxane (II) contains at least 4 SiH groups per molecule and when X of said silicone polymer (I) is said oxime group, said organohydrogenpolysiloxane (II) contains at least 5 SiH groups per molecule.

DETAILED DESCRIPTION OF THE INVENTION

Component (I) of the compositions used in the method of the present invention is a moisture-curable liquid tetrafunctional or hexafunctional silicone polymer having the general formula $$X_2RSiO(R'_2SiO)_nSiRX_2 \quad (i)$$

or $$X_3SiO(R'_2SiO)_nSiX_3 \quad (ii)$$

wherein R and R' each represent a monovalent hydrocarbon radical selected from the group consisting of alkyl radicals having 1 to 4 carbon atoms; such as methyl, ethyl, isopropyl and butyl; a halogenated alkyl radical having 1 to 3 carbon atoms, such as trifluoropropyl and chloropropyl; an alkenyl radical having 1 to 3 carbon atoms; such as vinyl and allyl; an aryl radical, such as phenyl, tolyl, and xylyl; an arylalkyl radical, such as betaphenylethyl and beta-phenylpropyl; and a cycloaliphatic radical, such as cyclopentyl and cyclohexyl. For the purposes of this invention, at least 95% of R' radicals are methyl. Preferably, all R and R' groups are methyl. The value for n in the above formulas is selected so as to provide a viscosity of about 1 to 500 Poise for silicone polymer (I) at 25° C. Preferably, this viscosity is about 40 to 150 Poise at 25° C. The hydrolyzable group X in the above formulas is selected from the group consisting of an alkoxy radical having 1 to 3 carbon atoms and an oxime group having the formula —ON=C(R")$_2$, in which R" is independently selected from the group consisting of an alkyl radical having 1 to 20 carbon atoms and vinyl.

The scientific and patent literature is replete with examples of conventional moisture-curable systems based on the above described silicone polymers and since these compositions are well known in the art and are available commercially, detailed description thereof is considered unnecessary. By way of illustration, the interested reader is referred to the extensive bibliographies provided in U.S. Pat. No. 3,635,887. hereby incorporated by reference, and chapter 8 of W. Noll's text *Chemistry and Technology of Silicones.* Academic Press. N.Y. (1968) for further descriptions of the above cure chemistries.

Briefly stated, the silicone polymer (I) can be prepared by reacting a liquid alpha, omega-dihydroxydiorganopolysiloxane of the general structure $$(HO)R'_2SiO(R'_2SiO)_{n-2}SiR'_2(OH) \quad (iii)$$

wherein R' and n are defined above, with a stoichiometric excess of a silane having hydrolyzable groups selected from the alkoxy or oxime moieties previously represented by the group X in formula (i) or (ii). For example, silanes such as methyltrimethoxysilane, tetramethoxysilane, vinyltrioximosilane tetraoximosilane or methyltrioximosilane may be used. The hydrolyzable groups of the silane react with the terminal hydroxyls of the diorganopolysiloxane to form a capped silicone polymer which is then capable of curing by exposure to moisture. Typically, such room temperature vulcanizing (RTV) compositions also contain a filler such as silica calcium carbonate, titanium dioxide, and silicone resin, inter alia. It is herein preferred that the moisture-curable composition used in the method of the present invention contain a silica filler having a surface area of about 50 to about 400 m²/g. Such fillers are typically employed at about 1 to about 15 parts by weight for each 100 parts by weight of said silicone polymer (I). The RTV compositions may further contain appropriate catalysts to promote the intended moisture cure under ambient conditions.

Organohydrogenpolysiloxane (II) is a linear, cyclic, or branched liquid siloxane which is miscible with said silicone polymer (I). For the purposes of the present invention, this component has a viscosity of less than about 100 Poise at 25° C. contains at least four silicon-bonded hydrogen radicals (i.e. SiH) per molecule when X of silicone polymer (I) is said alkoxy group and contains at least five SiH groups per molecule when X is said oxime group. The organic groups of organohydrogenpolysiloxane (II) can be independently selected from alkyl radicals having 1 to 4 carbon atoms or a phenyl radical with the proviso that no more than about 20 mole percent of said organic groups are phenyl. When the organic groups of the organohydrogenpolysiloxane (II) are selected from higher alkyl groups, or phenyl radicals are present at a level greater than about 20 percent, it has been observed that components (I) and (II) are not compatible and the objects of the invention are not achieved.

It is preferred that component (II) is a linear polymer or copolymer which comprises R'''(H)SiO$_{2/2}$ units and, optionally. R'''$_2$SiO$_{2/2}$ units, wherein R''' is independently selected from alkyl radicals having 1 to 4 carbon atoms or phenyl, as described above, the polymer or copolymer being otherwise in compliance with the provisions previously recited. The end groups of such polymers or copolymers are not considered critical as long as they are inert with respect to the other ingredients employed. Examples of suitable terminal groups include such structures as Me$_3$SiO$_\frac{1}{2}$ and HMe$_2$SiO$_\frac{1}{2}$, in which Me hereinafter denotes a methyl radical. Preferred structures of this type are based on linear liquids wherein R''' is methyl, such as those represented by the formula $$QMe_2SiO(Me_2SiO)_x(MeHSiO)_ySiMe_2Q$$

in which Q is the above defined group R''' or H and the values of x and y are adjusted so as to provide the requisite number of SiH groups per molecule while maintaining the viscosity within the above stated limit. It is highly preferred that x=0 in the above formula such that organohydrogenpolysiloxane (II) has the structure $$Me_3SiO(MeHSiO)_bSiMe_3$$

in which b has an average value of 30 to 100, most preferably about 70.

According to the method of the present invention, moisture-curable compositions are first prepared by thoroughly mixing, on a solids basis, from about 10 to about 50 parts by weight, preferably from 20 to 40 parts of organohydrogenpolysiloxane (II) with 100 parts by weight of silicone polymer (I). If desired or appropriate, the moisture-curable compositions of this invention can further comprise typical additives used in the formulation of conventional RTV compositions, such as catalysts, fillers, pigments, dyes, flow modifiers, thickeners and cure-control additives, inter alia. As far as is known, the order of mixing is not critical with respect to such additions.

As stated above, when the moisture-curable composition is based on a silicone polymer (I) having alkoxy functionality, the organohydrogenpolysiloxane (II) utilized should contain at least four silicon hydride (SiH) groups in its molecule in order to impart the improved corrosion resistance according to the present invention. In addition as is well known in the art, the curable systems based on the alkoxy-functional silicones should also contain a cure catalyst known to promote the hydrolysis of the alkoxy groups and the condensation of alkoxy with silanol groups to form a three-dimensional siloxane network. Catalysts suitable for this purpose may be selected from the organotitanates, such as tetraisopropyl titanate and tetrabutyl titanate and organometallic compounds, such as dibutyltin dilaurate, tin octoate, dibutyltin diacetate, zinc octoate, cobalt octoate, cobalt naphthanate and cerium naphthanate. Typically, from about 1 to 10 parts by weight of the catalyst are employed for each 100 parts by weight of the silicone polymer (I). For the purposes of the present invention, the preferred alkoxy functionality is methoxy (i.e., X in formula (i) or (ii) is —OMe).

In a similar way, when the moisture-curable composition is based on a silicone polymer (I) having oxime functionality, the organohydrogenpolysiloxane (II) utilized should contain at least five SiH groups in its molecule in order to impart the improved corrosion resistance according to the present invention. Unlike the alkoxy systems however, a catalyst is not absolutely necessary in this case if the silicone polymer (I) is prepared with relatively pure silanes. Otherwise, a catalyst can be advantageously employed to promote the curing reaction. Effective catalysts in this regard are exemplified by structures such as Ti(OR'''')$_4$ or (AcAc)-Ti(OR'''')$_2$, in which R'''' is independently selected from alkyl radicals having 3 to 8 carbon atoms and AcAc denotes an acetylacetonate group. A particularly preferred catalyst for this purposed is tetrabutyl titanate. For the purposes of the present invention, the preferred oxime functionality is given by the formula —ON=C(R'')$_2$ in which R'' is independently selected from methyl or ethyl radicals, a highly preferred oxime group of the invention being —ON=C(Me)(Et), in which Et hereinafter denotes an ethyl radical.

In practice, the above moisture-curable compositions are typically diluted with an organic solvent in order to provide a desired coating composition viscosity. Such solvents as hexane, heptane toluene, xylene, mineral spirits, ketones, and acetates are suitable for this purpose. Alternatively, a 100% solids system is also contemplated if the viscosity is not too great.

According to the instant method, the resulting coating composition is subsequently applied to a metal surfaces by any of the methods commonly practised in the coatings arts. For example, substrates may be dipped, brushed, sprayed, or flow coated. Optimal amounts of solvents and catalyst to be included in such coating compositions may readily be determined by routine experimentation. After coating of the metal substrates with the coating compositions of this invention, the coatings, which typically should be at least 1 mil in thickness, preferably 3-5 mils, are cured by exposure to ambient humidity. This cure process can, of course, be hastened by increasing humidity and/or temperature.

The compositions of the present invention find particular utility as coating compositions for metal articles, such as sheet, wire and particles. When applied as 100% solids, or from solution, and cured on such substrates as iron, steel, aluminum, brass, cobalt-nickel alloys, magnesium, silver or copper, coatings comprising these compositions provide excellent corrosion protection to the metal surfaces. This is particularly true for the case of ferrous metals exposed to moisture and salt, whereby the corrosion resistance of the substrate is characterized by at least 1000 hours of failure-free salt fog exposure, defined infra, and such failure-free exposure is at least twice that obtained with the corresponding composition which does not contain said organohydrogenpolysiloxane (II).

EXAMPLES

The following examples are presented to further illustrate the compositions of this invention, but are not to be constructed as limiting the invention, which is delineated in the appended claims. All parts and percentages in the examples are on a weight basis and viscosities are measured at 25° C unless indicated to the contrary.

Example 1

A conventional moisture-curable composition (RTV A) based on a tetramethoxy-functional polydimethylsiloxane polymer was prepared. RTV A consisted of a reaction product of: (A) 93.5% of a polymer base consisting of 83.3% hydroxyl-terminated polydimethylsiloxane (degree of polymerization of about 378 and a viscosity of about 40 Poise) and 16.7% of a trimethylated silica having a surface area of about 250 m²/g, (B) 0.5% tetrabutyl titanate and (C) 6% of an endcapping composition consisting of 99.95% methyltrimethoxysilane and 0.05% of a fluorescent dye (UVITEX TM OB, Ciba-Geigy Corp., Greensboro, N.C.).

The above moisture-curable composition was uniformly mixed with 0, 10, 20 and 40 parts of a liquid organohydrogenpolysiloxane per 100 parts of RTV A, said organohydrogenpolysiloxane having the average formula $$Me_3SiO(MeHSiO)_{70}SiMe_3 \qquad (a)$$

wherein Me hereinafter denotes a methyl radical, and a paraffinic solvent (ISOPAR TM G, Exxon Chemical Co., Houston, TX) as shown in Table 1.

TABLE 1

|  | Formulation 1 | Form. 2 | Form. 3 | Form. 4 |
|---|---|---|---|---|
| RTV A | 20 parts | 15 | 15 | 15 |
| Polysiloxane (a) | 0 | 1.5 | 3 | 6 |
| ISOPAR ™ G | 10 | 5 | 5 | 5 |

Duplicate 3"×6" SAE 1010 cold rolled steel smooth finish panels were cleaned with hot water and a Scotch-Brite ™ pad, rinsed with deionized water and blown dry with filtered air. The panels were brush-coated to a final dry film thickness (DFT) of 3-5 mils in two application (each coat 1.5-2.5 mils DFT), allowing each coat to cure overnight at ambient temperature and humidity. After the second coat was cured, the backs of the panels were coated with a commercially available corrosion resistant silicone coating. The edges of the panels were then taped with Kaptor ™ tape and the panel was single-scribed according to American Society for Testing Materials (ASTM) D1654 using a tungsten carbide tool. The panels were placed in a salt fog chamber (ASTM B117; sodium chloride concentration of 5% and a temperature of 37° C.) after curing at ambient conditions a total of seven days. The panels were removed from the salt fog cabinet every one to two weeks and evaluated in accordance to ASTM D1654 and ASTM D610 for extent of corrosion. Time to failure was recorded in Table 2. failure being defined herein as a rating of less than 5 by ASTM D1654 (i.e. average corrosion creepage from scribe line greater than 5 mm=3/16 inch) and less than 10 by ASTM D610 (i.e., essentially no surface rusting outside of the scribed area). The above mentioned ASTM standard tests are well known in the art and further description thereof is not considered necessary.

TABLE 2

| Example 1 Formulation | Parts (per hundred RTV A) of polysiloxane (a) | Hours to Failure |
|---|---|---|
| 1 (control) | 0 | 750 |
| 2 | 10 | 3300 |
| 3 | 20 | 3300 |
| 4 | 40 | 3300 |

(COMPARATIVE) EXAMPLE 2

The above described RTV A was mixed with different amounts of a liquid trimethylsilyl-ended polydimethylsiloxane (PDMS) having a viscosity of about 50 cP and a paraffinic solvent, as shown in Table 3.

TABLE 3

|  | Formulation 1 | Form. 2 | Form. 3 |
|---|---|---|---|
| RTV A | 20 parts | 20 | 15 |
| PDMS fluid | 0 | 4 | 6 |
| ISOPAR ™ G | 10 | 10 | 7.5 |

Panels were prepared, coated, and evaluated as described in Example 1, these results being reported in Table 4.

TABLE 4

| Example 2 Formulation | Parts (per hundred RTV A) of PDMS | Hours to Failure |
|---|---|---|
| 1 (Control) | 0 | 750 |
| 2 | 20 | 550 |
| 3 | 40 | 1275 |

EXAMPLE 3

A liquid alpha,omega-dihydroxydimethylpolysiloxane fluid having a degree of polymerization (DP) of about 539 and a viscosity of about 140 Poise was end-capped with methyltrimethoxysilane using tetrabutyl titanate to facilitate the reaction between the silanols and the methoxy groups, this composition being shown in table 5.

TABLE 5

| Hydroxy-ended PDMS (DP = 539) | 172.5 parts |
|---|---|
| MeSi(OCH$_3$)$_3$ | 13.8 |
| Tetrabutyl titanate | 1.4 |

After being placed in a 100° C. over for 1½ hours, mixed and allowed to sit overnight at room temperature, the resulting composition, RTV B, comprised a silicone polymer having the calculated average formula

RTV B was mixed with different amounts of liquid organohydrogenpolysiloxanes (b) and (c) having the average formulas

| Me$_3$SiO(MeHSiO)$_4$SiMe$_3$ | (b) |
|---|---|
| Me$_3$SiO(MeHSiO)$_8$SiMe$_3$ | (c) | and a paraffinic solvent, as shown in Table 6.

TABLE 6

|  | Formulation 1 | Form. 2 | Form. 3 | Form. 4 | Form. 5 |
|---|---|---|---|---|---|
| Base Polymer | 20 parts | 20 | 15 | 20 | 15 |
| siloxane (b) | 0 | 4 | 6 | 0 | 0 |
| siloxane (c) | 0 | 0 | 0 | 4 | 6 |
| ISOPAR ™ G | 7.8 | 7.8 | 7.8 | 7.8 | 7.8 |

Panels were prepared, coated, and evaluated as described in Example 1, the results being presented in Table 7.

TABLE 7

| Example 3 Formulation | Parts (per hundred RTV B) of siloxane (b) or (c) | Hours to Failure |
|---|---|---|
| 1 (Control) | 0 | 325 |
| 2 | 20 parts (b) | 2950 |
| 3 | 40 parts (b) | 3475 |
| 4 | 20 parts (c) | 4000 |
| 5 | 40 parts (c) | 4000 |

(COMPARATIVE) EXAMPLE 4

RTV B of Example 3 was mixed with different amounts of liquid organohydrogenpolysiloxanes (d) and (e) having the average formulas

| Me$_3$SiO(MeHSiO)SiMe$_3$ | (d) |
|---|---|
| Me$_3$SiO(MeHSiO)$_2$SiMe$_3$ | (e) | and a paraffinic solvent, as shown in Table 8.

TABLE 8

| | Formulation 1 | Form. 2 | Form. 3 | Form. 4 | Form. 5 |
|---|---|---|---|---|---|
| RTV B | 20 parts | 20 | 15 | 20 | 15 |
| siloxane (d) | 0 | 4 | 6 | 0 | 0 |
| siloxane (e) | 0 | 0 | 0 | 4 | 6 |
| ISOPAR ™ G | 7.8 | 7.8 | 7.8 | 7.8 | 7.8 |

Panels were prepared, coated, and evaluated as described in Example 1 and the results are presented in Table 9.

TABLE 9

| Example 4 Formulation | Parts (per hundred RTV B) of siloxane (d) or (e) | Hours to Failure |
|---|---|---|
| 1 (Control) | 0 | 325 |
| 2 | 20 parts (d) | 650 |
| 3 | 40 parts (d) | 575 |
| 4 | 20 parts (e) | 575 |
| 5 | 40 parts (e) | 800 |

EXAMPLE 5

RTV A of Example 1 was mixed with different amounts of liquid organohydrogenpolysiloxanes (f) and (g) having the average formulas

| Me$_3$SiO(MeHSiO)$_{10}$(Me$_2$SiO)$_{103}$SiMe$_3$ | (f) |
|---|---|
| Me$_3$SiO(MeHSiO)$_4$(Me$_2$SiO)$_9$SiMe$_3$ | (g) | and a paraffinic solvent, as shown in Table 10.

TABLE 10

| | Formulation 1 | Form. 2 | Form. 3 |
|---|---|---|---|
| RTV A | 15 parts | 15 | 15 |
| siloxane (f) | 0 | 6 | 0 |
| siloxane (g) | 0 | 0 | 3 |
| ISOPAR ™ G | 7.5 | 7.5 | 7.5 |

Panels were prepared, coated, and evaluated as described in Example 1 and the results are given in Table 11.

TABLE 11

| Example 5 Formulation | Parts (per hundred RTV A) of siloxane (f) or (g) | Hours to Failure |
|---|---|---|
| 1 (Control) | 0 | 600 |
| 2 | 40 parts (f) | 2200 |
| 3 | 20 parts (g) | 2800 |

EXAMPLE 6

RTV A of Example 1 was mixed with different amounts of a liquid cyclic organohydrogenpolysiloxane (h) having the average formula

$$(Me(H)SiO)_x \qquad (h)$$

where x=4 and 5 and a paraffinic solvent, as shown in Table 12.

TABLE 12

| | Formulation 1 | Form. 2 | Form. 3 |
|---|---|---|---|
| RTV A | 15 parts | 15 | 15 |
| siloxane (h) | 0 | 3 | 6 |
| ISOPAR ™ G | 7.5 | 7.5 | 7.5 |

Panels were prepared, coated, and evaluated as described in Example 1 and the results are given in Table 13.

TABLE 13

| Example 6 Formulation | Parts (per hundred RTV A) of siloxane (h) | Hours to Failure |
|---|---|---|
| 1 (Control) | 0 | 600 |
| 2 | 20 | 1850 |
| 3 | 40 | 2800 |

(COMPARATIVE) EXAMPLE 7

RTV A of Example 1 was mixed with different amounts of a liquid organohydrogenpolysiloxane (i) having the average formula $$Ph_2Si(OSiMe_2H)_2 \qquad (i)$$

wherein Ph hereinafter represents a phenyl radical, and a paraffinic solvent, as shown in Table 14.

TABLE 14

| | Formulation 1 | Form. 2 | Form. 3 |
|---|---|---|---|
| RTV A | 15 parts | 15 | 15 |
| siloxane (i) | 0 | 3 | 6 |
| ISOPAR ™ G | 7.5 | 7.5 | 7.5 |

Panels were prepared, coated, and evaluated as described in Example 1 and the results are given in Table 15.

TABLE 15

| Example 7 Formulation | Parts (per hundred RTV A) of siloxane (i) | Hours to Failure |
|---|---|---|
| 1 (Control) | 0 | 600 |
| 2 | 20 | 675 |
| 3 | 40 | 675 |

(COMPARATIVE) EXAMPLE 8

RTV A of Example 1 was mixed with different amounts of a liquid organohydrogenpolysiloxane (j) having the average formula

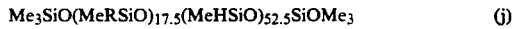

$$Me_3SiO(MeRSiO)_{17.5}(MeHSiO)_{52.5}SiOMe_3 \qquad (j)$$

(where R=—(CH$_2$)$_{17}$CH$_3$)

and a paraffinic solvent, as shown in Table 16.

TABLE 16

| | Formulation 1 | Form. 2 | Form. 3 |
|---|---|---|---|
| RTV A | 15 parts | 15 | 15 |
| siloxane (j) | 0 | 3 | 6 |
| ISOPAR ™ G | 7.5 | 7.5 | 7.5 |

Panels were prepared, coated, and evaluated as described in Example 1 and the results are given in Table 17.

TABLE 17

| Example 8 Formulation | Parts (per hundred RTV A) of siloxane (j) | Hours to Failure |
|---|---|---|
| 1 (Control) | 0 | 600 |
| 2 | 20 | 675 |
| 3 | 40 | 275 |

EXAMPLE 9

A moisture-curable composition (RTV C) was prepared according to the method described in Example 3 except that the liquid alpha,omega-dihydroxydimethylpolysiloxane fluid had a DP of about 378 and a viscosity of about 40 Poise, as shown in Table 18. The silicone polymer of this composition had the calculated average formula

$$(MeO)_2SiO(Me_2SiO)_{378}Si(OMe)_2$$

TABLE 18

| hydroxy-ended PDMS (DP = 378) | 144 parts |
|---|---|
| MeSi(OMe)$_3$ | 11.5 |
| Tetrabutyl titanate | 1.2 |

RTV C was mixed with different amounts of siloxane (a), described in Example 1, a paraffinic solvent, and a curing amount of catalyst, as shown in Table 19.

TABLE 19

|  | Formulation 1 | Form. 2 | Form. 3 |
|---|---|---|---|
| RTV C | 12 parts | 12 | 11 |
| siloxane (a) | 0 | 2.4 | 4.4 |
| ISOPAR ™ G | 1.5 | 1.5 | 1.5 |
| Tetrabutyl titanate | 0.1 | 0.1 | 0.1 |

Panels were prepared, coated, and evaluated as described in Example 1 and the results are presented in Table 20.

TABLE 20

| Example 9 Formulation | Parts (per hundred RTV C) of siloxane (a) | Hours to Failure |
|---|---|---|
| 1 (Control) | 0 | 350 |
| 2 | 20 | 2625 |
| 3 | 40 | 2625 |

EXAMPLE 10

RTV C was mixed with different amounts of a liquid organohydrogenpolysiloxane (k) having the average formula $$Me_3SiO(MeHSiO)_5(Me_2SiO)_3SiMe_3 \quad (k)$$

a paraffinic solvent, and a curing amount of catalyst, as shown in Table 21.

TABLE 21

|  | Formulation 1 | Form. 2 | Form. 3 |
|---|---|---|---|
| RTV C | 12 parts | 12 | 11 |
| siloxane (k) | 0 | 2.4 | 4.4 |
| ISOPAR ™ G | 1.5 | 1.5 | 1.5 |
| Tetrabutyl titanate | 0.1 | 0.1 | 0.1 |

Panels were prepared, coated, and evaluated as described in Example 1 and the results are presented in Table 22.

TABLE 22

| Example 10 Formulation | Parts (per hundred RTV C) of siloxane (k) | Hours to Failure |
|---|---|---|
| 1 (Control) | 0 | 350 |
| 2 | 20 | 2625 |
| 3 | 40 | 2625 |

EXAMPLE 11

RTV C was mixed with different amounts of siloxane (h), described in Example 6, a paraffinic solvent, and a curing amount of catalyst, as shown in Table 23.

TABLE 23

|  | Formulation 1 | Form. 2 | Form. 3 |
|---|---|---|---|
| RTV C | 12 parts | 12 | 11 |
| siloxane (h) | 0 | 2.4 | 4.4 |
| ISOPAR ™ G | 1.5 | 1.5 | 1.5 |
| Tetrabutyl titanate | 0.1 | 0.1 | 0.1 |

Panels were prepared, coated, and evaluated as described in Example 1 and the results are presented in Table 24.

TABLE 24

| Example 11 Formulation | Parts (per hundred RTV C) of siloxane (h) | Hours to Failure |
|---|---|---|
| 1 (Control) | 0 | 350 |
| 2 | 20 | 2625 |
| 3 | 40 | 2625 |

(COMPARATIVE) EXAMPLE 12

RTV C was mixed with different amounts of a liquid organohydrogenpolysiloxane (l), having the average formula

$$HSiO(Me_2SiO)_{10}SiH \quad (1)$$
(with Me substituents)

a paraffinic solvent, and a curing amount of catalyst, as shown in Table 25.

TABLE 25

|  | Formulation 1 | Form. 2 | Form. 3 |
|---|---|---|---|
| RTV C | 12 parts | 12 | 11 |
| siloxane (l) | 0 | 2.4 | 4.4 |
| ISOPAR ™ G | 1.5 | 1.5 | 1.5 |
| Tetrabutyl titanate | 0.1 | 0.1 | 0.1 |

Panels were prepared, coated, and evaluated as described in Example 1 and the results are presented in Table 26.

TABLE 26

| Example 12 Formulation | Parts (per hundred RTV C) of siloxane (l) | Hours to Failure |
|---|---|---|
| 1 (Control) | 0 | 350 |
| 2 | 20 | 525 |
| 3 | 40 | 525 |

EXAMPLE 13

A liquid alpha,omega-dihydroxydimethylpolysiloxane fluid having a DP of about 378 and a viscosity of about 40 Poise was endcapped with methyltris(methylethylketoxime)silane using tetrabutyl titanate to facilitate the reaction between the silanols and the oxime groups.

The constituents of this composition (RTV D) are shown in Table 27, wherein Et hereinafter denotes an ethyl radical.

TABLE 27

| | |
|---|---|
| Hydroxy-ended PDMS (DP = 378) | 120 parts |
| MeSi(ON=CMeEt)$_3$ | 8.4 |
| Tetrabutyl titanate | 6 |
| ISOPAR ™ G | 20 |

The silicone polymer of RTV D had the calculated average formula $$(EtMeC=NO)_2SiO(Me_2SiO)_{378}Si(ON=CMeEt)_2$$

RTV D was mixed with different amounts of siloxane (a), described in Example 1, as shown in Table 28.

TABLE 28

| | Formulation 1 | Form. 2 | Form. 3 |
|---|---|---|---|
| RTV D | 11 parts | 11 | 10 |
| siloxane (a) | 0 | 1.9 | 3.5 |

Panels were prepared, coated, and evaluated as described in Example 1 and the results are presented in Table 29.

TABLE 29

| Example 13 Formulation | Parts (per hundred RTV D) of siloxane (a) | Hours to Failure |
|---|---|---|
| 1 (Control) | 0 | 240 |
| 2 | 20 | 3000 |
| 3 | 40 | 3000 |

EXAMPLE 14

RTV D was mixed with different amounts of siloxane (k), described in Example 10, as shown in Table 30.

TABLE 30

| | Formulation 1 | Form. 2 |
|---|---|---|
| RTV D | 11 parts | 11 |
| siloxane (k) | 0 | 1.9 |

Panels were prepared, coated, and evaluated as described in Example 1 and the results are presented in Table 31.

TABLE 31

| Example 14 Formulation | Parts (per hundred RTV D) of siloxane (k) | Hours to Failure |
|---|---|---|
| 1 (Control) | 0 | 240 |
| 2 | 20 | 3000 |

EXAMPLE 15

RTV D was mixed with different amounts of siloxane (h), described in Example 6, as shown in Table 32.

TABLE 32

| | Formulation 1 | Form. 2 | Form. 3 |
|---|---|---|---|
| RTV D | 11 parts | 11 | 10 |
| siloxane (h) | 0 | 1.9 | 3.5 |

Panels were prepared, coated, and evaluated as described in Example 1 and the results are presented in Table 33.

TABLE 33

| Example 15 Formulation | Parts (per hundred RTV D) of siloxane (h) | Hours to Failure |
|---|---|---|
| 1 (Control) | 0 | 240 |
| 2 | 20 | 3000 |
| 3 | 40 | 3000 |

(COMPARATIVE) EXAMPLE 16

RTV D was mixed with different amounts of siloxane (l), described in Example 12, as shown in Table 34.

TABLE 34

| | Formulation 1 | Form. 2 | Form. 3 |
|---|---|---|---|
| RTV D | 11 parts | 11 | 10 |
| siloxane (l) | 0 | 1.9 | 3.5 |

Panels were prepared, coated, and evaluated as described in Example 1 and the results are presented in Table 35.

TABLE 35

| Example 16 Formulation | Parts (per hundred RTV D) of siloxane (l) | Hours to Failure |
|---|---|---|
| 1 (Control) | 0 | 240 |
| 2 | 20 | 725 |
| 3 | 40 | 900 |

(COMPARATIVE) EXAMPLE 17

RTV A of Example 1 was mixed with different amounts of a liquid organohydrogensilane (m) of the formula $$CH_3(CH_2)_{15}SiH_3 \qquad (m)$$

and a paraffinic solvent, as shown in Table 36.

TABLE 36

| | Formulation 1 | Form. 2 | Form. 3 |
|---|---|---|---|
| RTV A | 7 parts | 7 | 7 |
| silane (m) | 0 | 1.4 | 2.8 |
| ISOPAR ™ G | 5 | 5 | 5 |

Panels were prepared, coated, and evaluated as described in example 1 and the results are presented in Table 37.

TABLE 37

| Example 17 Formulation | Parts (per hundred RTV A) of silane (m) | Hours to Failure |
|---|---|---|
| 1 (Control) | 0 | 875 |
| 2 | 20 | 1200 |
| 3 | 40 | 240 |

EXAMPLE 18

RTV A of Example 1 was mixed with different amounts of a liquid organohydrogen siloxane (n) of the formula $$Si(OSi(Me)_2H)_4 \qquad (n)$$

and an paraffinic solvent, as shown in Table 38.

TABLE 38

| | Formulation 1 | Form. 2 | Form. 3 |
|---|---|---|---|
| RTV A | 15 parts | 15 | 15 |
| siloxane (n) | 0 | 3 | 6 |

TABLE 38-continued

|  | Formulation 1 | Form. 2 | Form. 3 |
|---|---|---|---|
| ISOPAR ™ G | 15 | 10 | 7.5 |

Panels were prepared, coated, and evaluated as described in Example 1 and the results are presented in Table 39.

TABLE 39

| Example 18 Formulation | Parts (per hundred RTV A) of siloxane (n) | Hours to Failure |
|---|---|---|
| 1 (Control) | 0 | 825 |
| 2 | 20 | 1775 |
| 3 | 40 | 1825 |

EXAMPLE 19

A liquid alpha,omega-dihydroxydimethylpolysiloxane fluid having a DP of about 539 and a viscosity of about 140 Poise was endcapped with a tetraoximosilane according to Table 40. The resulting moisture-curable composition, RTV E, comprised a silicone polymer having the calculated average formula

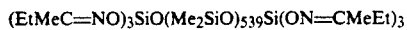

$(EtMeC=NO)_3SiO(Me_2SiO)_{539}Si(ON=CMeEt)_3$

TABLE 49

| Hydroxyl-ended PDMS (DP = 539) | 172.5 parts |
|---|---|
| Si(ON=CMeEt)$_4$ | 36.2 |
| ISOPAR ™ G | 8.0 |

RTV E was mixed with different amounts of siloxane (c), described in Example 3, and a paraffinic solvent, as shown in Table 41.

TABLE 41

|  | Formulation 1 | Form. 2 | Form. 3 |
|---|---|---|---|
| RTV E | 20 parts | 20 | 15 |
| siloxane (c) | 0 | 3.5 | 5.3 |
| ISOPAR ™ G | 6.9 | 6.9 | 6.9 |

Panels were prepared, coated, and evaluated as described in Example 1 and the results are presented in Table 42.

TABLE 42

| Example 19 Formulation | Parts (per hundred RTV E) of siloxane (c) | Hours to Failure |
|---|---|---|
| 1 (Control) | 0 | 150 |
| 2 | 20 | 2000 |
| 3 | 40 | 2000 |

(COMPARATIVE) EXAMPLE 20

RTV E was mixed with different amounts of siloxanes (b), (d) and (e), described in Examples 3 and 4, and a paraffinic solvent, as shown in Table 43.

TABLE 43

|  | Formulation 1 | Form 2 | Form 3 | Form 4 | Form 5 | Form 6 | Form 7 |
|---|---|---|---|---|---|---|---|
| RTV E | 20 | 20 | 15 | 20 | 15 | 20 | 15 |
| siloxane (b) | 0 | 3.5 | 5.3 | 0 | 0 | 0 | 0 |
| siloxane (d) | 0 | 0 | 0 | 3.5 | 5.3 | 0 | 0 |
| siloxane (e) | 0 | 0 | 0 | 0 | 0 | 3.5 | 5.3 |
| ISOPAR ™ G | 6.9 | 6.9 | 6.9 | 6.9 | 6.9 | 6.9 | 6.9 |

Panels were prepared, coated, and evaluated as described in Example 1 and the results are presented in Table 44.

TABLE 44

| Example 20 Formulation | Parts (per hundred RTV E) of siloxane (b), (d) or (e) | Hours to Failure |
|---|---|---|
| 1 (Control) | 0 | 150 |
| 2 | 20 | 150 |
| 3 | 40 | 150 |
| 4 | 20 | 150 |
| 5 | 40 | 150 |
| 6 | 20 | 150 |
| 7 | 40 | 150 |

EXAMPLE 21

A liquid alpha,omega-dihydroxydimethylpolysiloxane fluid having a DP of about 378 and a viscosity of about 40 Poise was endcapped with a tetraoximosilane according to the composition of Table 45. This composition, RTV F, contained silicone polymer having the calculated average formula

$(EtMeC'NO)_3SiO(Me_2SiO)_{378}Si(ON=CMeEt)_3$

TABLE 45

| Hydroxy-ended PDMS | 115 parts |
|---|---|
| Si(ON=CMeEt)$_4$ | 24.1 |
| ISOPAR ™ G | 5.3 |

RTV F was mixed with different amounts of siloxanes (a) and (k), described in Examples 1 and 10, as shown in Table 46.

TABLE 46

|  | Formulation 1 | Form. 2 | Form. 3 | Form. 4 | Form. 5 |
|---|---|---|---|---|---|
| RTV F | 11 parts | 11 | 10 | 11 | 10 |
| siloxane (a) | 0 | 1.9 | 3.5 | 0 | 0 |
| siloxane (k) | 0 | 0 | 0 | 1.9 | 3.5 |

Panels were prepared, coated, and evaluated as described in Example 1 and the results are presented in Table 47.

TABLE 47

| Example 21 Formulation | Parts (per hundred RTV F) of siloxane (a) or (k) | Hours to Failure |
|---|---|---|
| 1 (Control) | 0 | 175 |
| 2 | 20 | 2350 |
| 3 | 40 | 1650 |
| 4 | 20 | 2465 |
| 5 | 40 | 1650 |

(COMPARATIVE) EXAMPLE 22

RTV F was mixed with different amounts of siloxanes (h) and (l), described in Examples 6 and 12, as shown in Table 48.

TABLE 48

|  | Formulation 1 | Form. 2 | Form. 3 | Form. 4 | Form. 5 |
|---|---|---|---|---|---|
| RTV F | 11 parts | 11 | 10 | 11 | 10 |
| siloxane (h) | 0 | 1.9 | 3.5 | 0 | 0 |
| siloxane (l) | 0 | 0 | 0 | 1.9 | 3.5 |

Panels were prepared, coated, and evaluated as described in Example 1 and the results are presented in Table 49.

TABLE 49

| Example 22 Formulation | Parts (per hundred RTV F) of siloxane (h) or (l) | Hours to Failure |
|---|---|---|
| 1 (Control) | 0 | 175 |
| 2 | 20 parts (h) | 725 |
| 3 | 40 parts (h) | 900 |
| 4 | 20 parts (l) | 300 |
| 5 | 40 parts (l) | 175 |

(COMPARATIVE) EXAMPLE 23

RTV F was mixed with different amounts of siloxanes (i) and (j), described in examples 7 and 8, as shown in Table 50.

TABLE 50

|  | Formulation 1 | Form. 2 | Form. 3 | Form. 4 | Form. 5 |
|---|---|---|---|---|---|
| RTV F | 15 parts | 15 | 15 | 15 | 15 |
| siloxane (i) | 0 | 2.6 | 5.3 | 0 | 0 |
| siloxane (j) | 0 | 0 | 0 | 2.6 | 5.3 |

Panels were prepared, coated, and evaluated as described in Example 1 and the results are presented in Table 51.

TABLE 51

| Example 23 Formulation | Parts (per hundred RTV F) of siloxane (i) or (j) | Hours to Failure |
|---|---|---|
| 1 (Control) | 0 | 200 |
| 2 | 20 | 200 |
| 3 | 40 | 200 |
| 4 | 20 | 775 |
| 5 | 40 | 775 |

(COMPARATIVE) EXAMPLE 24

A liquid alpha,omega-dihydroxydimethylpolysiloxane fluid having a DP of about 539 and a viscosity of about 140 Poise was endcapped with methylvinyl bis(n-methylacetamide)silane and an N,N-diethylaminoxypolysiloxane having the average formula $$Me_3SiO(Me_2SiO)_3(MeSiO)_5Si_3$$
$$|$$
$$ON(Et)_2$$

in dimethylformamide solvent according to the composition of Table 52 to form RTV G.

TABLE 52

| hydroxy-ended PDMS (DP = 539) | 100 parts |
|---|---|
| Methylvinyl bis(n-methylacetamide)silane | 2.5 |
| N,N-diethylaminoxypolysiloxane | 1 |
| Dimethylformamide | 1 |

RTV G, which is a moisture-curable composition of the type described in above-cited U.S. Pat. No. 3,817,909 to Toporcer et al., was mixed with different amounts of siloxane (a), described in Example 1, and a paraffinic solvent, as shown in Table 53.

TABLE 53

|  | Formulation 1 | Form. 2 | Form. 3 |
|---|---|---|---|
| RTV G | 20 parts | 20 | 20 |
| siloxane (a) | 0 | 4 | 8 |
| ISOPAR ™ G | 7.5 | 7.5 | 7.5 |

Panels were prepared, coated, and evaluated as described in Example 1 and the results are presented in Table 54.

TABLE 54

| Example 24 Formulation | Parts (per hundred RTV G) of siloxane (a) | Hours to Failure |
|---|---|---|
| 1 (Control) | 0 | 250 |
| 2 | 20 | 150 |
| 3 | 40 | 150 |

The method of the present invention resulted in improved corrosion resistance to the extent that failure times in the above described salt fog test were at least two times greater for the instant compositions containing the organohydrogenpolysiloxane (II) of the present invention than for control moisture-curable RTVs. Moreover, according to the requirements of the invention, the absolute failure times of the instant RTV systems was at least 1000 hours when measured by these standard corrosion tests. The only inconsistency in these observations related to the cyclic organohydrogenpolysiloxane (h), shown in Example 6. This siloxane contained molecules having both 4 and 5 SiH groups and hence reflects the transition from non-operative to operative embodiments for RTVs based on the silicone polymers having oxime functionality. Thus, RTV D of Example 15 met the criteria of the present method while RTV F of Example 22 did not, both systems employing the organohydrogenpolysiloxane (h).

We claim:

1. A method for imparting corrosion resistance to a metal substrate comprising coating said substrate with a moisture-curable silicone composition and subsequently curing said silicone composition on said substrate, said silicone composition consisting essentially of a homogeneous blend of (I) a silicone polymer selected from the group consisting of those having the average structure $$X_2RSiO(R'_2SiO)_nSiRX_2$$

and $$X_3SiO(R'_2SiO)_nSiX_3$$

wherein R and R' each represent a monovalent hydrocarbon radical selected from the group consisting of alkyl radicals having 1 to 4 carbon atoms, a halogenated alkyl radical having 1 to 3 carbon atoms, an aryl radical, an arylalkyl radical, and a cycloaliphatic radical, at least 95 mole percent of groups R' being methyl, X is a hydrolyzable group selected from the group consisting of an alkoxy radical having 1 to 3 carbon atoms and an oxime group having the formula $-ON=C(R'')_2$ in which R'' is independently selected from the group consisting of an alkyl radical having 1 to 20 carbon atoms and vinyl and n has a value such that said silicone polymer has a viscosity of about 1 to 500 Poise at 25° C.;

and (II) from about 10 to about 50 parts by weight, per 100 parts by weight of said silicone polymer (I), of a liquid organohydrogenpolysiloxane, the organic groups of which are independently selected from the group consisting of alkyl radicals having 1 to 4 carbon atoms and a phenyl radical, no more than 20 mole percent of said organic groups of said organohydrogenpolysiloxane (II) being phenyl with the proviso that when X of said silicone polymer (I) is said alkoxy radical, said silicone composition further comprises an effective amount of a cure catalyst for said silicone polymer (I) and said organohydrogenpolysiloxane (II) contains at least 4 silicon hydride groups per molecule and when X of said silicon polymer (I) is said oxime group, said organohydrogenpolysiloxane (II) contains at least 5 silicon hydride groups per molecule.

2. The method according to claim 1, wherein X of said silicone polymer (I) is said alkoxy group and R' is methyl.

3. The method according to claim 2, wherein X of said silicone polymer (I) is a methoxy group.

4. The method according to claim 3, wherein said organohydrogenpolysiloxane (II) is represented by the formula $$QMe_2SiO(Me_2SiO)_x(MeHSiO)_ySiMe_2Q$$

in which Me represents a methyl radical. Q is selected from the group consisting of alkyl radicals having 1 to 4 carbon atoms, a phenyl radical and hydrogen and the values of x and y are adjusted so as to provide at least 4 silicon hydride groups per molecule of said organohydrogenpolysiloxane while maintaining the viscosity thereof below 100 Poise at 25° C.

5. The method according to claim 4, wherein said organohydrogenpolysiloxane (II) is represented by the formula $$Me_3SiO(MeHSiO)_bSiMe_3$$

in which Me denotes a methyl radical and b has an average value of 30 to 100.

6. The method according to claim 3, wherein 20 to 40 parts by weight of said organohydrogenpolysiloxane (II) are used for each 100 parts by weight of said silicone polymer (I).

7. The method according to claim 1, wherein X of said silicone polymer (I) is said oxime group and R' is methyl.

8. The method according to claim 7, wherein R" of said oxime group is selected from the group consisting of methyl and ethyl radicals.

9. The method according to claim 8, wherein said organohydrogenpolysiloxane (II) is represented by the formula $$QMe_2SiO(Me_2SiO)_x(MeHSiO)_ySiMe_2Q$$

in which Me represents a methyl radical. Q is selected from the group consisting of alkyl radicals having 1 to 4 carbon atoms, a phenyl radical and hydrogen and the values of x and y are adjusted so as to provide at least 5 silicon hydride groups per molecule of said organohydrogenpolysiloxane while maintaining the viscosity thereof below 100 Poise at 25° C.

10. The method according to claim 9 wherein said organohydrogenpolysiloxane (II) is represented by the formula $$Me_3SiO(MeHSiO)_bSiMe_3$$

in which Me denotes a methyl radical and b has an average value of 30 to 100.

11. The method according to claim 8, wherein 20 to 40 parts by weight of said organohydrogenpolysiloxane (II) are used for each 100 parts by weight of said silicone polymer (I).

12. A moisture-curable silicone composition consisting essentially of a homogeneous blend of (I) a silicone polymer selected from the group consisting of those having the average structure $$X_2RSiO(R'_2SiO)_nSiRX_2$$

and $$X_3SiO(R'_2SiO)_nSiX_3$$

wherein R and R' each represent a monovalent hydrocarbon radical selected from the group consisting of alkyl radicals having 1 to 4 carbon atoms, a halogenated alkyl radical having 1 to 3 carbon atoms, an aryl radical, an arylalkyl radical, and a cycloaliphatic radical, at least 95 mole percent of groups R' being methyl, X is a hydrolyzable group selected from the group consisting of an alkoxy radical having 1 to 3 carbon atoms and an oxime group having the formula $-ON=C(R'')_2$ in which R" is independently selected from the group consisting of an alkyl radical having 1 to 20 carbon atoms and vinyl and n has a value such that said silicone polymer has viscosity of about 1 to 500 Poise at 25° C.; and (II) from about 10 to about 50 parts by weight, per 100 parts by weight of said silicone polymer (I), of a liquid organohydrogenpolysiloxane, the organic groups of which are independently selected from the group consisting of alkyl radicals having 1 to 4 carbon atoms and a phenyl radical, no more than 20 mole percent of said organic groups of said organohydrogenpolysiloxane (II) being phenyl with the proviso that when X of said silicone polymer (I) is said alkoxy radical, said silicone composition further comprises an effective amount of a cure catalyst for said silicone polymer (I) and said organohydrogenpolysiloxane (II) contains at least 4 silicon hydride groups per molecule and when X of said silicone polymer (I) is said oxime group, said organohydrogenpolysiloxane (II) contains at least 5 silicon hydride groups per molecule.

13. The composition according to claim 12, wherein X of said silicone polymer (I) is said alkoxy group and R' is methyl.

14. The composition according to claim 13, wherein X of said silicone polymer (I) is a methoxy group.

15. The composition according to claim 14, wherein said organohydrogenpolysiloxane (II) is represented by the formula $$QMe_2SiO(Me_2SiO)_x(MeHSiO)_ySiMe_2Q$$

in which Me represents a methyl radical, Q is selected from the group consisting of alkyl radicals having 1 to 4 carbon atoms, a phenyl radical and hydrogen and the values of x and y are adjusted so as to provide at least 4 silicon hydride groups per molecule of said organohydrogenpolysiloxane while maintaining the viscosity thereof below 100 Poise at 25° C.

16. The composition according to claim 15, wherein said organohydrogenpolysiloxane (II) is represented by the formula $$Me_3SiO(MeHSiO)_bSiMe_3$$

in which Me denotes a methyl radical and b has an average value of 30 to 100.

17. The composition according to claim 14, wherein 20 to 40 parts by weight of said organohydrogenpolysiloxane (II) are used for each 100 parts by weight of said silicone polymer (I).

18. The composition according to claim 12, wherein X of said silicone polymer (I) is said oxime group and R' is methyl.

19. The composition according to claim 18, wherein R%'' of said oxime group is selected from the group consisting of methyl and ethyl radicals.

20. The composition according to claim 19, wherein said organohydrogenpolysiloxane (II) is represented by the formula $$QMe_2SiO(Me_2SiO)_x(MeHSiO)_ySiMe_2Q$$

in which Me represents a methyl radical, Q is selected from the group consisting of alkyl radicals having 1 to 4 carbon atoms, a phenyl radical and hydrogen and the values of x and y are adjusted so as to provide at least 5 silicon hydride groups per molecule of said organohydrogenpolysiloxane while maintaining the viscosity thereof below 100 Poise at 25° C.

21. The composition according to claim 20, wherein said organohydrogenpolysiloxane (II) is represented by the formula $$Me_3SiO(MeHSiO)_bSiMe_3$$

in which Me denotes a methyl radical and b has an average value of 30 to 100.

22. The composition according to claim 19, wherein 20 to 40 parts by weight of said organohydrogenpolysiloxane (II) are used for each 100 parts by weight of said silicone polymer (I).

* * * * *